US008199960B2

(12) United States Patent
Eaton

(10) Patent No.: US 8,199,960 B2
(45) Date of Patent: Jun. 12, 2012

(54) INTEGRATED SPEAKER AND DISPLAY

(75) Inventor: William Chris Eaton, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 1279 days.

(21) Appl. No.: 11/870,644

(22) Filed: Oct. 11, 2007

(65) Prior Publication Data

US 2009/0097691 A1    Apr. 16, 2009

(51) Int. Cl.
*H04K 1/02* (2006.01)
(52) U.S. Cl. ........................................ 381/388; 381/386
(58) Field of Classification Search .................. 381/388, 381/386, 398, 401
See application file for complete search history.

(56) References Cited

U.S. PATENT DOCUMENTS

2005/0128322 A1    6/2005   Eaton et al.
2006/0210099 A1    9/2006   Takahata et al.

FOREIGN PATENT DOCUMENTS

EP    1271999    1/2003

OTHER PUBLICATIONS

International Preliminary Report on Patentability, corresponding to International Patent Application No. PCT/US2008/064453, dated Apr. 22, 2010.
International Search Report, corresponding to International Patent Application No. PCT/US2008/064453, dated Aug. 20, 2008.
Written Opinion, corresponding to International Patent Application No. PCT/US2008/064453, dated Aug. 20, 2008.

*Primary Examiner* — Roy Potter
(74) *Attorney, Agent, or Firm* — Moore & Van Allen, PLLC; Sreenivas Vedantam

(57) ABSTRACT

An integrated speaker and display that includes a display and a speaker assembly. The display is substantially integrated within the speaker assembly. The display is embedded between a coil of the speaker assembly and/or magnets of the speaker assembly. The speaker assembly may include a diaphragm located either on a side of the display facing a viewer of the display or opposite a side of the display facing a viewer of the display. The electronic device may be any type of device, for example, a mobile phone, a personal digital assistant (PDA), an electronic game, a computer, an audio player, a video player, a television, or a display device. The display may be any type of display, for example, a liquid crystal display (LCD), a digital light processing (DLP) display, a light-emitting diode display (LED), or a plasma display.

20 Claims, 5 Drawing Sheets

INTEGRATED SPEAKER AND DISPLAY

BACKGROUND OF THE INVENTION

The present invention is related to speakers, and more specifically to an integrated speaker and display.

As physical volume in many electronic devices is occupied principally by a display, a battery, and other components, the need for the acoustic components to occupy less or minimal space is high. Electronic devices such as cell phones, personal digital assistants (PDAs), laptop computers, portable audio players (e.g., MP3 players), portable video players, etc. are continually being made smaller and smaller, thus minimizing the available space for electronic components, and other components such as speaker systems, inside of these devices. Current speaker systems take up valuable space in these electronic components.

BRIEF SUMMARY OF THE INVENTION

Embodiments of the present invention are related to an integrated speaker and display that includes a display, and a speaker assembly, the display being substantially integrated within the speaker assembly.

Embodiments of the present invention are further related to an electronic device that includes a display, and a speaker assembly, the display being substantially integrated within the speaker assembly.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
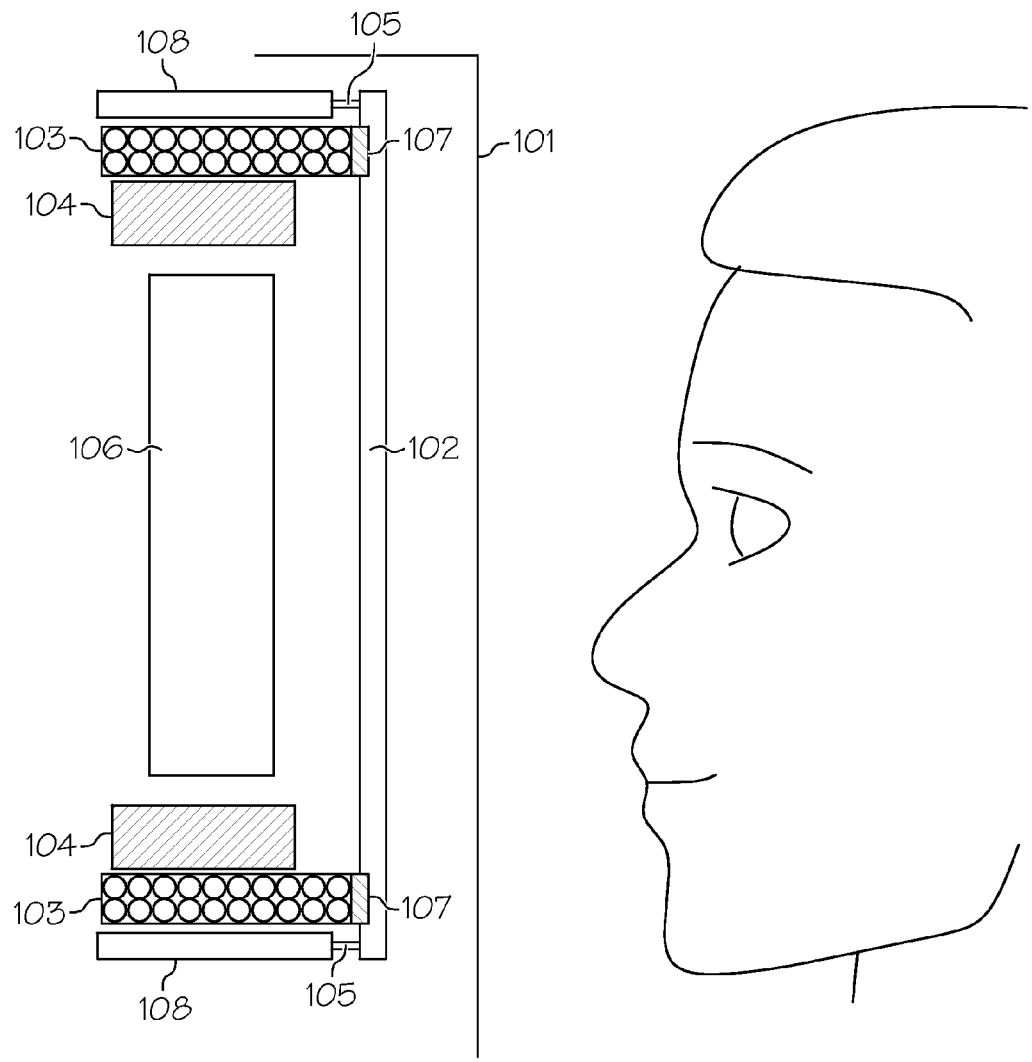
FIG. 1 is a diagram of an integrated speaker and display according to an example embodiment of the present invention.

As will be appreciated by one of skill in the art, the present invention may be embodied as a method, system, device, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system."

Embodiments of the present invention relate to an integrated speaker and display where a display and a speaker assembly are integrated together thus providing a speaker and display that takes up less area when compared with the area taken if each of these were separate entities. An integrated speaker and display according to embodiments of the present invention may occupy only slightly more space than the display itself and allows for a speaker having an area much larger than is available for current speakers when the display is large. According to embodiments of the present invention, as a display size grows, a speaker size may also grow in proportion, therefore providing an incremental improvement in sound quality. Since the speaker and display are integrated, an increase in size of the display resulting in an increase in speaker size does not have the adverse effect of taking up substantially more space.

Further, according to embodiments of the present invention, an integrated speaker and display may include any type of display, for example, a liquid crystal display (LCD), a digital light processing (DLP) display, a light-emitting diode (LED) display, a plasma display, etc. The display may be of any size since as the display size changes, the size of the speaker assembly may change accordingly. A speaker assembly according to embodiments of the present invention may include a diaphragm, a coil, and one or more magnets. The display may be embedded between one or more coils of the speaker assembly, or may be embedded between magnets of the speaker assembly, or may be embedded between a coil and magnets of the speaker assembly. The one or more magnets may have metal added to change the magnetic field of the magnets. Further, a former may be used around the coils to hold the coils together and keep them from coming apart. An adhesive may be used to connect the diaphragm to the coils. In addition, the diaphragm may be connected to a portion of a housing or structure that contains the integrated speaker and display.

According to embodiments of the present invention, a diaphragm of a speaker assembly in an integrated speaker and display may be relatively rigid and composed of a relatively rigid material. The relatively rigid diaphragm may be attached to a portion of a structure housing the integrated speaker and display or may be attached to a component of the speaker assembly (e.g., coil, magnet, etc.) via appropriate attachments. The diaphragm may be attached to the structure or speaker assembly via a softedge type material such as, for example, rubber, vinyl, closed-cell foam, etc., or any other compliant material. This softedge material may provide an elastic effect as the relatively rigid diaphragm is excited and moved from magnetic fields generated via the magnet and coil. An excited diaphragm may have a piston-type movement due to the rigid structure of the diaphragm and the softedge attachment. In other embodiments according to the present invention, a diaphragm in a speaker assembly may be made of any non-rigid material commonly used in the manufacture of diaphragms and other type membranes.

In addition, regardless of the material used in the manufacture of the diaphragm, a diaphragm in an integrated speaker and display according to embodiments of the present invention may reside in a location on a side of the display that is projecting an image or other information viewable by a viewer looking at the display, or the diaphragm may reside in a location on a side of the display opposite a side of the display facing a viewer of the display. If the diaphragm resides in a location on a side of the display facing a viewer of the display, the diaphragm may be transparent allowing viewing of the display through the diaphragm. Embodiment according to the present invention may include any appropriate transparent material that may be used as a diaphragm such as, for example, Styrene Acrylonitrile (SAN) & Acrylonitrile Styrene Acrylate (ASA), Allylics DAP, DAIP, ADC, etc.

An integrated speaker and display according to embodiments of the present invention may be included in any type of structure or any type of device. The integrated speaker and display may be included in a non-portable structure such as, for example, a large television or large display device, or may be included in a portable device such as, for example, a mobile phone, a personal digital assistant (PDA) an electronic game, a computer, an audio player (portable or non-portable), a video player (portable or non-portable), etc. An integrated speaker and display according to embodiments of the present invention takes up less space in these structures and devices than would normally be taken up by a separate display and speaker. Further, as the structure or device decreases in size, an integrated speaker and display becomes more advantageous in its minimal use of space. Also, if a structure or device increases in size, a larger display and speaker may be used. A larger speaker may result in improved sound quality while taking minimal space in the structure or device.

FIG. 1 shows a diagram of an integrated speaker and display according to an example embodiment of the present invention. The integrated speaker and display may be included in a structure or device 101 and may include a speaker assembly and a display 106. The speaker assembly may include a diaphragm 102, a coil 103 and one or more magnets 104. In this example embodiment, the display 106 is embedded in the speaker assembly. The magnets 104 may be located in the speaker assembly closest to the sides of the display 106. For example, in the speaker assembly of this example embodiment, the coil may be located at a distance from the center of the speaker assembly. The magnets 104 may be located at a position more proximate to the center of the speaker assembly and generally at a position inside the coil 103. Further, the display of this embodiment may be located more proximate to the center of the speaker assembly than the magnets 104.

As illustrated in FIG. 1, the coil 103, the magnets 104, and the display 106 have a depth and the speaker assembly itself has a depth. In the illustrated embodiment, the magnets 104 may be at least partially located within the depth of the coil 103 and the display may be at least partially located within the depth of the magnets 104 and/or the coil 103. Accordingly, the magnets 104 may be at least partially embedded in the depth of the coil 103 and the display 106 may be at least partially embedded in the depth of the magnets 104 and/or coil 103. Thus, the depth of the speaker assembly may be varied based on a position of the coil, the magnets, and the display relative to one another.

The diaphragm 102 in this example embodiment is shown connected to a coil 103 portion of the speaker assembly by attachments 105. The attachments 105 may be composed of a softedge material and the diaphragm 102 may be composed of a rigid material. Alternatively, the attachments 105 may not be composed of a softedge material and the diaphragm 102 may be composed of non-rigid materials used in the construction of diaphragms. In this example embodiment, the diaphragm 102 may be located on a side of the display 106 that faces a viewer of the display 106. Therefore, the diaphragm 102 is transparent allowing viewing of the display 106 through the diaphragm 102.

The one or more magnets 104 may have metal added to change the magnetic field of the magnets 104. Further, a former may be used around the coils 103 to hold the coils 103 together and keep them from coming apart. An adhesive 107 may be used to connect the diaphragm 102 to the coils 103. In addition, a softedge or surround of the diaphragm 102 may be connected to a portion 108 of a housing or structure that contains the integrated speaker and display.

Figure 2:
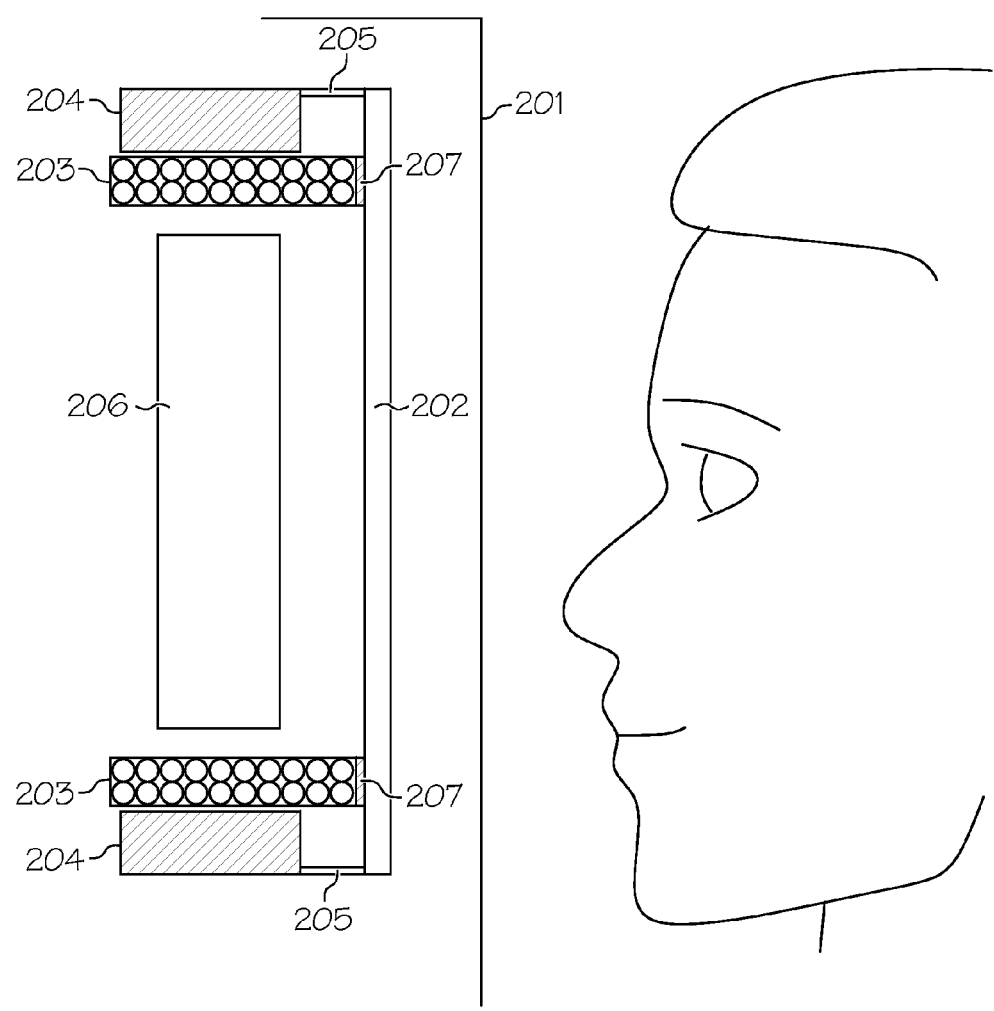
FIG. 2 is a diagram of an integrated speaker and display according to a second example embodiment of the present invention.

FIG. 2 shows a diagram of an integrated speaker and display according to a second example embodiment of the present invention. In this embodiment, the integrated speaker and display may be included in a structure or device 201 and may include a speaker assembly and a display 206. Although not shown, the structure 201 has height, depth, and width dimensions and various components of the speaker assembly may be housed within the dimensions of the structure 201. The speaker assembly may include a diaphragm 202, a coil 203 and one or more magnets 204. In this example embodiment, the display 206 may be embedded in the speaker assembly where the coil 203 is located in the speaker assembly closest to the sides of the display 206. For example, the one or more magnets 204 may be located at a distance from the center of the speaker assembly. The coil 203 may located at a position more proximate to the center of the speaker assembly and generally at a position inside the magnets 204. Further, the display 206 may be located more proximate to the center of the speaker assembly than the coil 203. As illustrated in FIG. 2, the coil 203, the magnets 204, and the display 206 have a height and a depth where the magnets 204 may be at least partially located within the depth of the coil 203 and the display may be at least partially located within the depth of the coil 203 and/or the magnets 204. Accordingly, the magnets 204 may be at least partially embedded in the depth of the coil 203 and the display 206 may be at least partially embedded in the depth of the magnets 204 and/or the coil 203.

The diaphragm 202 in this example embodiment is shown connected to a magnet 204 portion of the speaker assembly by attachments 205. The attachments 205 may be composed of a softedge material and the diaphragm 202 may be composed of a rigid material. Alternatively, the attachments 205 may not be composed of a softedge material and the diaphragm 202 may be composed of non-rigid materials used in the construction of diaphragms. In this example embodiment, the diaphragm 202 may be located on a side of the display 206 that faces a viewer of the display 206. Therefore, the diaphragm 202 is transparent allowing viewing of the display 206 through the diaphragm 202.

The one or more magnets 204 may have metal added to change the magnetic field of the magnets 204. Further, a former may be used around the coils 203 to hold the coils 203 together and keep them from coming apart. An adhesive 207 may be used to connect the diaphragm 202 to the coils 203.

Figure 3:
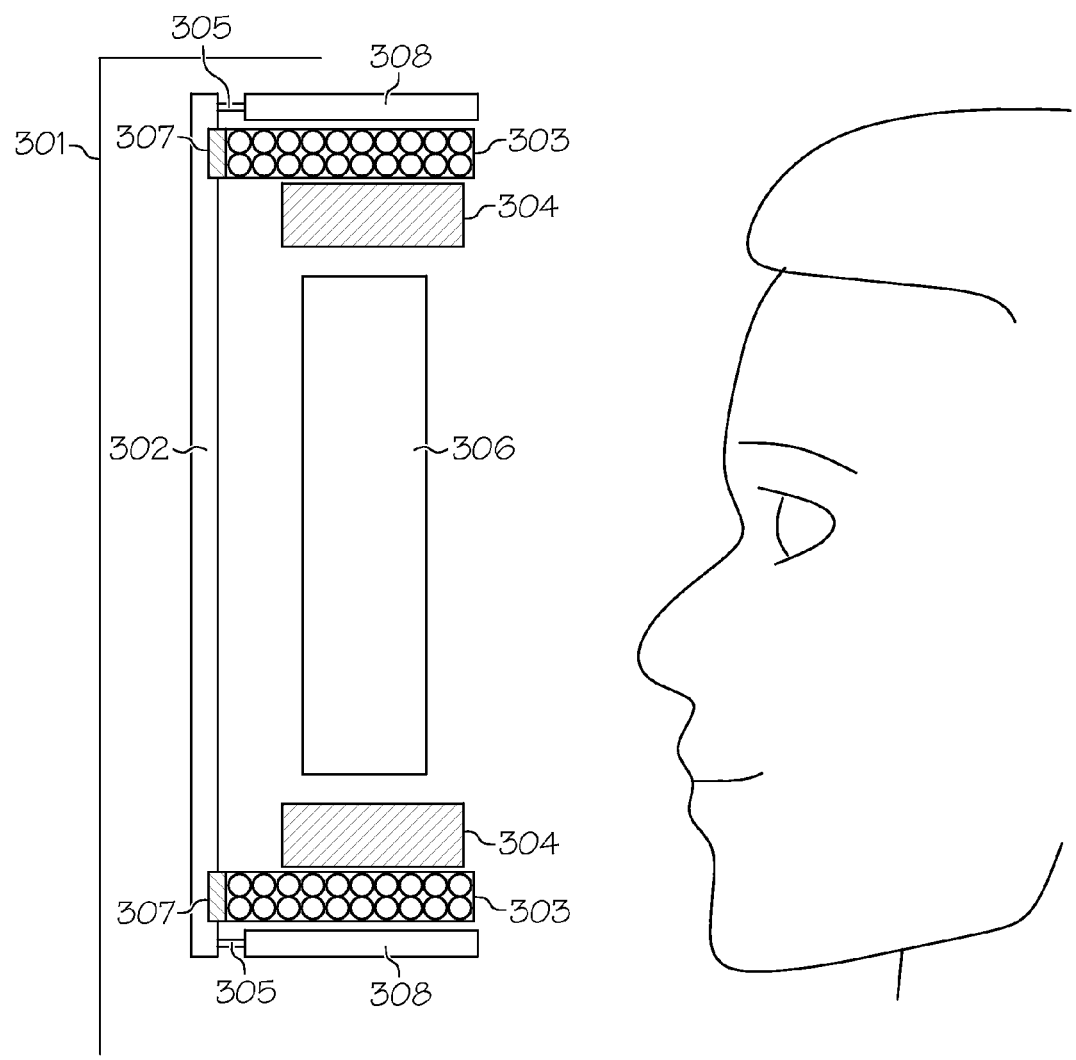
FIG. 3 is a diagram of an integrated speaker and display according to a third example embodiment of the present invention.

FIG. 3 shows a diagram of an integrated speaker and display according to a third example embodiment of the present invention. In this embodiment, the integrated speaker and display may be included in a structure or device 301 and may include a speaker assembly and a display 306. The speaker assembly may include a diaphragm 302, a coil 303 and one or more magnets 304. In this example embodiment, the display 306 may be embedded in the speaker assembly where the one or more magnets 304 are located in the speaker assembly in a position closest to the sides of the display 306. The diaphragm 302 in this example embodiment is shown connected to a coil 303 portion of the speaker assembly by attachments 305. The attachments 305 may be composed of a softedge material and the diaphragm 302 may be composed of a rigid material. Alternatively, the attachments 305 may not be composed of a softedge material and the diaphragm 302 may be composed of non-rigid materials used in the construction of diaphragms. In this example embodiment, the diaphragm 302 may be located on a side of the display 306 opposite a side that faces a viewer of the display 306.

The one or more magnets 304 may have metal added to change the magnetic field of the magnets 304. Further, a former may be used around the coils 303 to hold the coils 303 together and keep them from coming apart. An adhesive 307 may be used to connect the diaphragm 302 to the coils 303. In addition, a softedge or surround of the diaphragm 302 may be connected to a portion 308 of a housing or structure that contains the integrated speaker and display.

Figure 4:
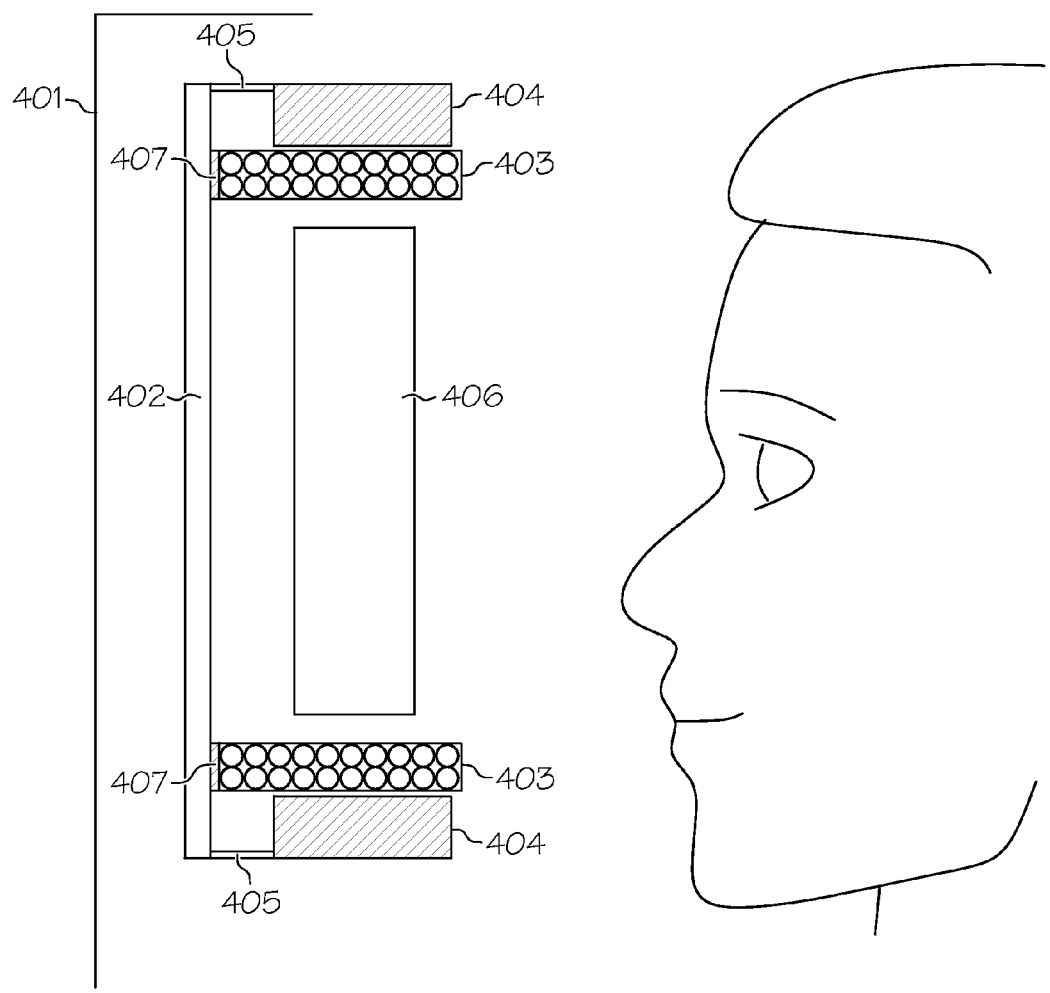
FIG. 4 is a diagram of an integrated speaker and display according to a fourth example embodiment of the present invention.

FIG. 4 shows a diagram of an integrated speaker and display according to a fourth example embodiment of the present invention. In this embodiment, the integrated speaker and display may be included in a structure or device 401 and may include a speaker assembly and a display 406. The speaker assembly may include a diaphragm 402, a coil 403 and one or more magnets 404. In this example embodiment, the display 406 may be embedded in the speaker assembly where the coil 403 is located in the speaker assembly in a position closest to the sides of the display 406. The diaphragm 402 in this example embodiment is shown connected to a magnet 404 portion of the speaker assembly by attachments 405. The attachments 405 may be composed of a softedge material and the diaphragm 402 may be composed of a rigid material. Alternatively, the attachments 405 may not be composed of a softedge material and the diaphragm 402 may be composed of non-rigid materials used in the construction of diaphragms. In this example embodiment, the diaphragm 402 may be located on a side of the display 406 opposite a side that faces a viewer of the display 406.

The one or more magnets 404 may have metal added to change the magnetic field of the magnets 404. Further, a former may be used around the coils 403 to hold the coils 403 together and keep them from coming apart. An adhesive 407 may be used to connect the diaphragm 402 to the coils 403.

Figure 5:
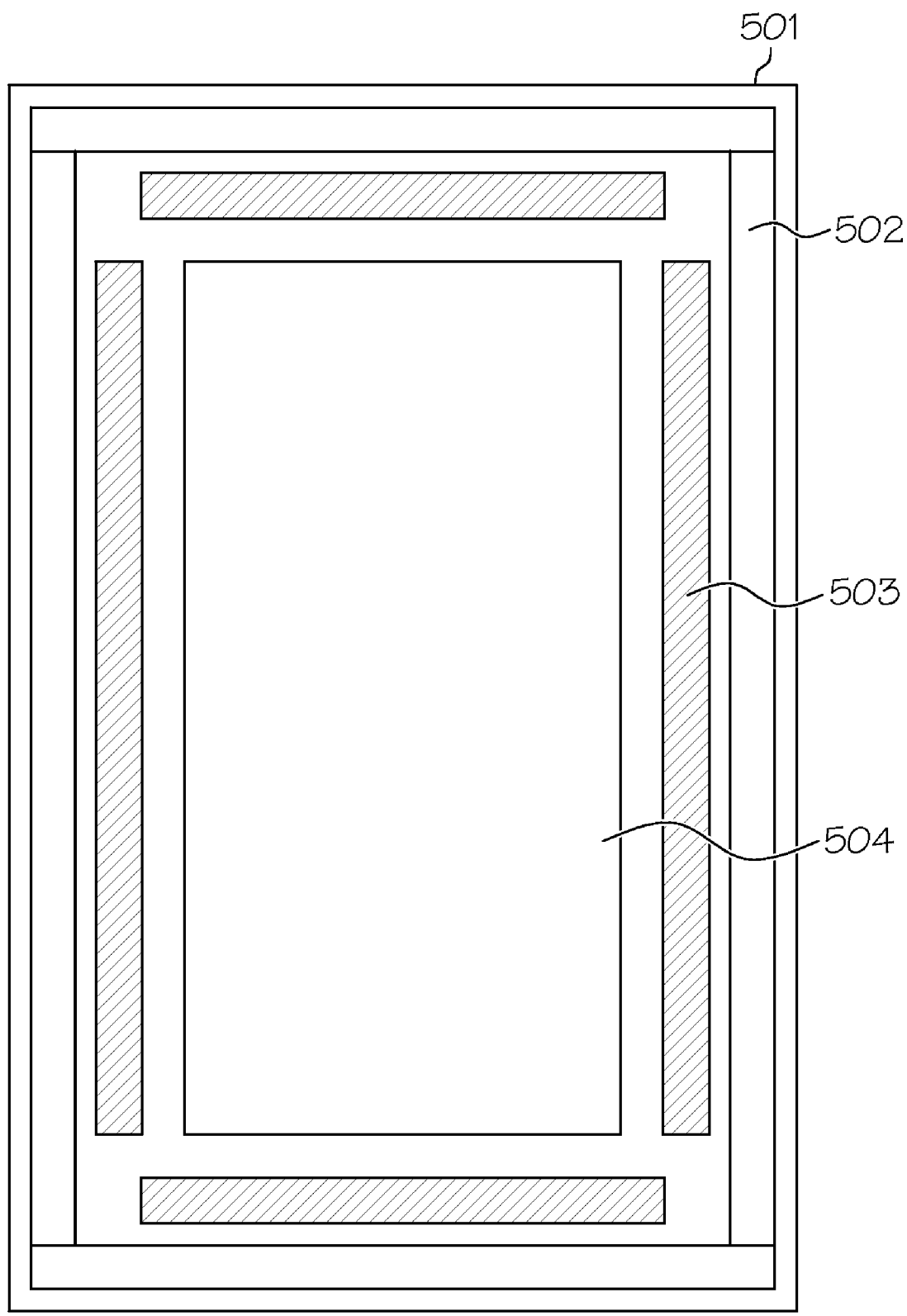
FIG. 5 is a diagram of a view of an integrated speaker and display according to an example embodiment of the present invention.

FIG. 5 shows a diagram of a view of an integrated speaker and display according to an example embodiment of the present invention. A structure 501 may include a display 504 integrated and embedded within a speaker assembly that includes magnets 503 and a coil 502. This view represents a plane or side of the display facing a viewer of the display or a plane or side opposite that facing a viewer of the display. In this example embodiment, the diaphragm is not shown but may be located covering the display area 504 shown or behind the display area 504. Although in this example embodiment the magnets 503 are shown in a location in a closer proximity to the embedded display 504 than the coil 502, as noted previously, this arrangement may be reversed and still be within the scope of the present invention. This view shows only the top (or bottom) of the coil 502 (e.g., one turn of the coil).

Therefore, according to embodiments of the present invention, an integrated speaker and display may decrease or increase in size accordingly with a size of a display being embedded within a speaker assembly of the integrated speaker and display. This provides additional space savings especially in devices such as portable devices where space is limited.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An integrated speaker and display comprising
a display; and
a speaker assembly, the display being substantially integrated within the speaker assembly, the speaker assembly comprising a plurality of pairs of components, wherein each pair comprises components that are located on opposite sides of a line of axis substantially perpendicular to the display.

2. The integrated speaker and display according to claim 1, wherein the display is positioned at a location between at least one of location of a coil of the speaker assembly or a location of at least two magnets of the speaker assembly.

3. The integrated speaker and display according to claim 1, wherein the speaker assembly includes a coil and magnets, the coil and the magnets having associated depth dimensions, wherein said display is located at a position that is at least partially within a depth dimension of at least one of the coil or the magnets.

4. The integrated speaker and display according to claim 1, the speaker assembly further comprising a diaphragm, the diaphragm being located on one of in front of a side of the display facing a viewer of the display or opposite a side of the display facing a viewer of the display.

5. The integrated speaker and display according to claim 1, wherein the integrated speaker and display is contained in a portable device.

6. The integrated speaker and display according to claim 1, the speaker assembly further comprising a diaphragm, the diaphragm being attached to one of a structure housing the integrated speaker and display or a portion of the speaker assembly.

7. The integrated speaker and display according to claim 6, the diaphragm being attached via a softedge material between the diaphragm and the structure or the portion of the speaker assembly, wherein the diaphragm is constructed of a rigid or non-rigid material.

8. The integrated speaker and display according to claim 1, the speaker assembly further comprising a diaphragm, the diaphragm being constructed of a non-rigid material.

9. An electronic device comprising:
a display; and
a speaker assembly, the display being substantially integrated within the speaker assembly, the speaker assembly comprising a plurality of pairs of components, wherein each pair comprises components that are located on opposite sides of a line of axis substantially perpendicular to the display.

10. The device according to claim 9, wherein the electronic device comprises one of a mobile phone, a personal digital assistant (PDA), an electronic game, a computer, an audio player, a video player, a television, or a display device.

11. The device according to claim 9, the display comprising one of a liquid crystal display (LCD), a digital light processing (DLP) display, a light-emitting diode display (LED), or a plasma display.

12. The device according to claim 9, wherein the display is located in a position between at least one of a coil of the speaker assembly or at least two magnets of the speaker assembly.

13. The device according to claim 9, wherein the speaker assembly includes a coil and magnets, the coil and the magnets having associated depth dimensions, wherein said display is located at a position that is at least partially within a depth dimension of at least one of the coil or the magnets.

14. The device according to claim 9, the speaker assembly further comprising a diaphragm, the diaphragm being located one of on a side of the display facing a viewer of the display or opposite a side of the display facing a viewer of the display.

15. The device according to claim 9, the speaker assembly further comprising a diaphragm, the diaphragm being attached to one of the device or a portion of the speaker assembly.

16. The device according to claim 15, the diaphragm being attached via a softedge material between the diaphragm and the device or the portion of the speaker assembly, wherein the diaphragm is constructed of a rigid or non-rigid material.

17. The device according to claim 9, the speaker assembly further comprising a diaphragm, the diaphragm being constructed of a non-rigid material.

18. The integrated speaker and display according to claim 1, the plurality of pairs of components comprising at least one pair of coils and at least one pair of magnets.

19. The integrated speaker and display according to claim 1, wherein the line of axis is substantially perpendicular to both the display and a diaphragm associated with the speaker assembly.

20. The device according to claim 1, wherein as the display size increases, the size of the speaker assembly increases, and wherein as the size of the speaker assembly increases, a space occupied by the speaker assembly does not increase substantially.

* * * * *